(12) United States Patent
McBride

(10) Patent No.: US 7,010,904 B2
(45) Date of Patent: Mar. 14, 2006

(54) METHOD FOR CONTROL SCHEDULING TO ACHIEVE LINEAR THRUST RESPONSE

(75) Inventor: Richard W. McBride, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 171 days.

(21) Appl. No.: 10/729,480

(22) Filed: Dec. 5, 2003

(65) Prior Publication Data
US 2005/0120716 A1 Jun. 9, 2005

(51) Int. Cl.
*F02C 9/00* (2006.01)
(52) U.S. Cl. .......................................... 60/204; 60/233
(58) Field of Classification Search .................. 60/204, 60/233, 240, 243, 773
See application file for complete search history.

(56) References Cited

U.S. PATENT DOCUMENTS

| | | | |
|---|---|---|---|
| 2,966,140 A * | 12/1960 | Dungan et al. .......... | 60/39.281 |
| 3,854,287 A | 12/1974 | Rembold | |
| 3,971,208 A | 7/1976 | Schwent | |
| 4,275,557 A | 6/1981 | Marvin et al. | |
| 5,048,285 A | 9/1991 | Schmitt et al. | |

* cited by examiner

*Primary Examiner*—Louis J. Casaregola
(74) *Attorney, Agent, or Firm*—Bachman & LaPointe, P.C.

(57) ABSTRACT

A method for achieving linear engine thrust response comprising the steps of measuring a throttle position (FNRQ), measuring a plurality of engine parameters, inputting the plurality of engine parameters and the throttle position into a plurality of schedules to produce a plurality of outputs, combining the plurality of outputs to produce a part power scheduled airflow (W2RSCH), and using the W2RSCH to produce a near linear thrust response of the engine.

12 Claims, 3 Drawing Sheets

METHOD FOR CONTROL SCHEDULING TO ACHIEVE LINEAR THRUST RESPONSE

BACKGROUND OF THE INVENTION (1) Field of the Invention

The present invention relates to a method of utilizing multiple schedules to provide linear thrust in response to linear throttle movements. More particularly, the present invention relates to a method of altering the operation of a gas turbine engine in response to throttle adjustments to produce a thrust response linearly related to such throttle adjustments.

(2) Description of the Related Art

Linear thrust response vs. throttle position is highly desirable to military pilots attempting precise maneuvers such as refueling or attempting to land on an aircraft carrier deck. Current methods of controlling a gas turbine engine allow linear thrust vs. throttle position to be scheduled at one flight condition (such as a carrier landing) but cannot maintain thrust linearity over a range of other critical flight conditions, such as refueling.

The shortcoming of the current method is rooted in the fact that a single characteristic of engine inlet corrected airflow (W2R) increase vs. thrust increase is used as a control schedule for all flight conditions. As each flight condition has its own unique values of idle and intermediate inlet airflows, engine thrust is typically very non-linear vs. inlet airflow.

FIG. 1 is a logic diagram illustrating the current method of scheduling part power inlet airflow at any flight condition for known idle and intermediate inlet airflows. The illustrated method requires the inputting of the throttle position (FNRQ), the idle power scheduled airflow (W2RID), and the intermediate power scheduled airflow (W2RINT). At step 1, there is utilized a schedule 11 used to schedule engine airflow comprised of a plot of the part power index (PLAIDX) as a function of the FNRQ. The inputted FNRQ measured at any time during an engine's operation is used as an index to the schedule 11 of step 1 and PLAIDX is outputted. This outputted PLAIDX is combined with the W2RID and the W2RINT to calculate a part power scheduled airflow (W2RSCH) according to the equation W2RSCH=W2RID+PLAIDX (W2RINT−W2RID). The calculated W2RSCH is utilized to add or subtract fuel flow to the engine in order to obtain a linear airflow giving rise to a predominantly linear thrust response to the movement of the throttle position.

Variations of this method involving engine fan speed are also possible due to the unique relationship between inlet flow and fan speed. The method described above provides a relatively linear thrust in response to linear movements of the throttle under certain well defined operating constraints. However, this method fails to produce a substantially linear thrust response over a broad range of operating conditions.

What is therefore needed is a method of achieving approximately linear thrust from idle power to intermediate power (i.e. maximum non-augmented thrust) at any flight condition.

SUMMARY OF THE INVENTION

Accordingly, it is an object of the present invention to provide a method of utilizing multiple schedules to provide linear thrust in response to linear throttle movements. More particularly, the present invention relates to a method of altering the operation of a gas turbine engine in response to throttle adjustments to produce a thrust response linearly related to such throttle adjustments.

In accordance with the present invention, a method for achieving linear engine thrust response comprises the steps of measuring a throttle position (FNRQ), measuring a plurality of engine parameters, inputting the plurality of engine parameters and the throttle position into a plurality of schedules to produce a plurality of outputs, combining the plurality of outputs to produce a part power scheduled airflow (W2RSCH), and using the W2RSCH to produce a near linear thrust response of the engine.

In further accordance with the present invention, a system for achieving linear engine thrust response comprises means for measuring a throttle position (FNRQ), means for measuring a plurality of engine parameters, means for inputting the plurality of engine parameters and the throttle position into a plurality of schedules to produce a plurality of outputs, means for combining the plurality of outputs to produce a part power scheduled airflow (W2RSCH), and means for using the W2RSCH to produce a near linear thrust response of the engine.

DETAILED DESCRIPTION

The present invention teaches a method of achieving approximately linear thrust from idle power to intermediate power (i.e. maximum non-augmented thrust) at any flight condition. This is achieved by determining the unique thrust vs. airflow characteristic at each flight condition that permits scheduling linear thrust vs. throttle position and using this real time characteristic as a control schedule. As a result, a plurality of control schedules are used to define inlet airflow between idle and intermediate power and are utilized to maintain linear thrust as flight condition changes instead of remaining fixed.

Figure 1:
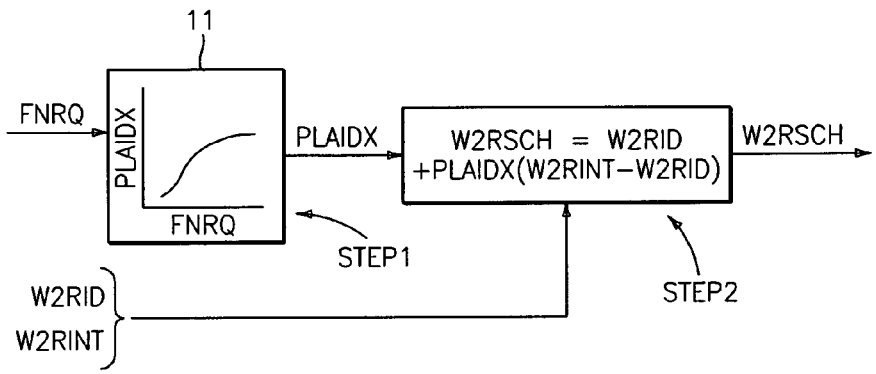
FIG. 1 A diagram of the method of scheduling part power inlet airflow known in the art.
Figure 2:
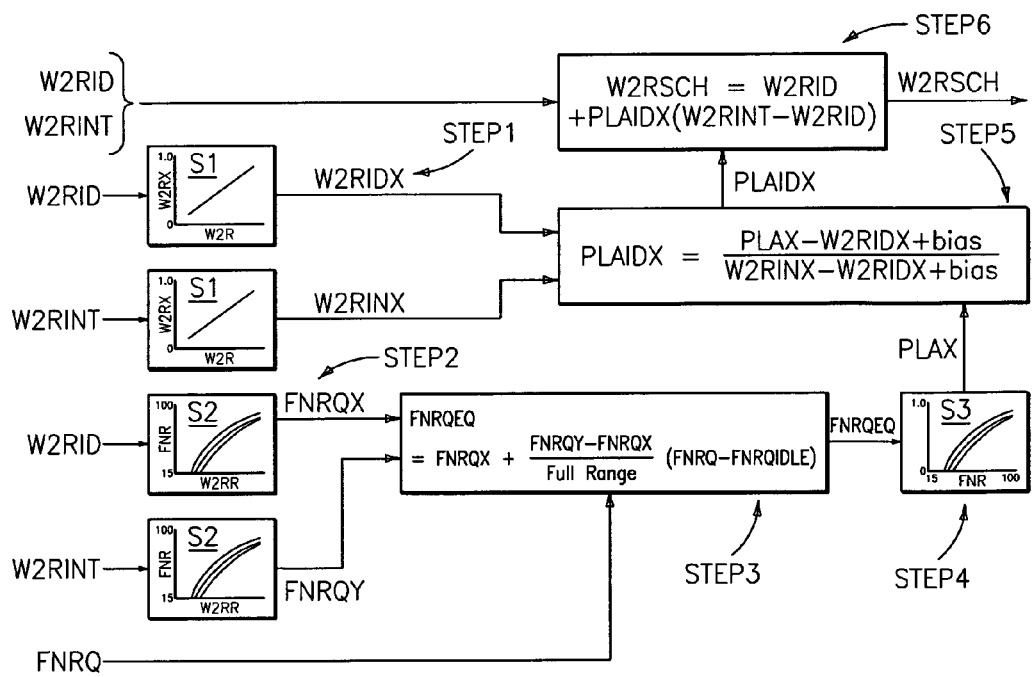
FIG. 2 A diagram of the method of scheduling part power inlet airflow of the present invention.

With reference to FIG. 2, there is illustrated the method of the present invention whereby the W2RD, W2RINT, and the FNRQ may be combined to produce a W2RCH which provides a substantially more linear thrust response to linear movements of the throttle. This is primarily accomplished through the utilization of three schedules (S1, S2, and S3) as opposed to the single schedule illustrated in FIG. 1 and discussed above with reference to the prior art. Returning to FIG. 2, note that step 6 of the method of the present invention computes W2RSCH from W2RID, W2RINT, and PLAIDX through a combination according to the equation W2RSCH=W2RID+PLAIDX (W2RINT−W2RID) as illustrated in step 6.

As with the prior art, W2RID and W2RINT are variables which are continuously derived from engine performance during the duration of engine operation. Specifically, for any given engine a schedule may be created from which W2RID is represented as a function of block number (XM) and inlet pressure (P2). Similarly, W2RINT may be represented by a schedule which expresses W2RINT as a function of P2 and inlet temperature (T2). As a result, P2, T2 and XM may be continuously monitored during engine operation and W2RID and W2RINT may subsequently be computed therefrom. FNRQ is obtained from a measurement of the throttle position.

With reference to step 1, there is illustrated the use of the schedule S1. Schedule S1 is a schedule which maps the engine inlet corrected airflow (W2R) to a W2R index (W2RX) comprising a value between 0 and 1.0. In schedule S1, the range of W2R spans from the absolute minimum to the absolute maximum airflow possible in an engine type for which schedule S1 is computed. As a result, the W2R observed in an operating engine will always be of a value represented on the x-axis of schedule S1. By entering W2RID as the value of W2R in schedule S1, a W2RID index (W2RIDX) is outputted. Similarly, by inputting W2RINT into schedule S1 as the value of W2R, a W2RINT index (W2RINTX) is outputted. These two outputs (W2RIDX), and (W2RINTX) form inputs of step 5 as described more fully below.

With reference to step 2, schedule S2 is utilized to map W2R to a throttle index (FNR). In the present example, the range of FNR of schedule S2 extends in an exemplary fashion from 15 to 100. The proper scale for FNR in schedule S2 is from a number indicative of throttle position at idle up to and including a number indicative of throttle position at maximum dry throttle. As is evident, W2RID is used as an input to schedule S2 to form the output throttle position index FNRQX. Likewise, W2RINT is inputted into schedule S2 so as to form the output throttle position index FNRQY. FNRQX. and FNRQY are then combined with FNRQ to create an FNRQ equivalent (FNRQEQ) as shown in step 3. In step 3 there is illustrated the equation by which FNRQEQ is computed. Specifically, FNRQEQ=FNRQX+ ((FNRQY−FNRQX)/full range) (FNRQ−FNRQIDLE)) where full range is equivalent to the intermediate throttle position minus the idle throttle position of the engine and FNRQIDLE is equal to the idle throttle position of the engine. As a result of step 3, there is computed and outputted FNRQEQ. FNRQEQ is used as the input to schedule S3 as illustrated in step 4 to produce the output PLAX. Schedule S3 maps the FNR value to a PLAX. PLAX is the fraction between minimum and maximum engine airflows (0=minimum airflow at any condition, 1.0=maximum airflow at any condition) to provide the fraction of thrust above minimum thrust (0=minimum or idle thrust, 1.0=maximum or intermediate thrust) requested by the throttle position. Lastly, step 5 illustrates the equation by which the outputs of by which the outputs of step 1 and step 4 are combined to form the output PLAIDX used as input to step 6. Specifically in step 5, PLAIDX is computed as follows: PLAIDX= (PLAX−W2RIDX plus bias)/(W2RINX−W2RIDX plus bias) where bias is a small value (typically approximately 0.0001) used to insure that the computation of PLAIDX never involves a division by zero. In an alternative embodiment, a check may be performed to insure that PLAIDX never involves such a division and, in the case that division by zero is present, PLAIDX is preferably outputted with a value of 1.0.

With reference to step 6, there is illustrated once again the combination of W2RID, W2RINT and PLAIDX to form the W2RSCH which is the scheduled thrust response used to achieve a linear thrust in response to the linear movement of the throttle.

With reference to step 4, there is illustrated once again the combination of W2RID, W2RINT and PLAIDX to form the W2RSCH which is the scheduled thrust response used to achieve a linear thrust in response to the linear movement of the throttle.

Figure 3A:
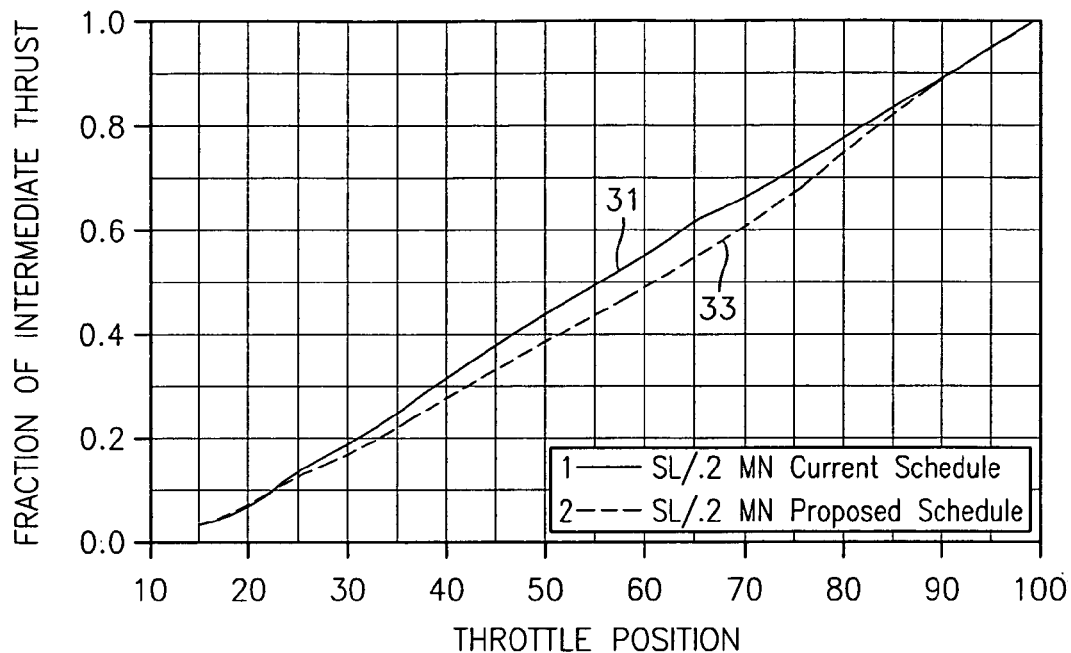
FIGS. 3a–3c Graphs showing the near linear thrust response of the present invention compared to that of the present invention.
Figure 3B:
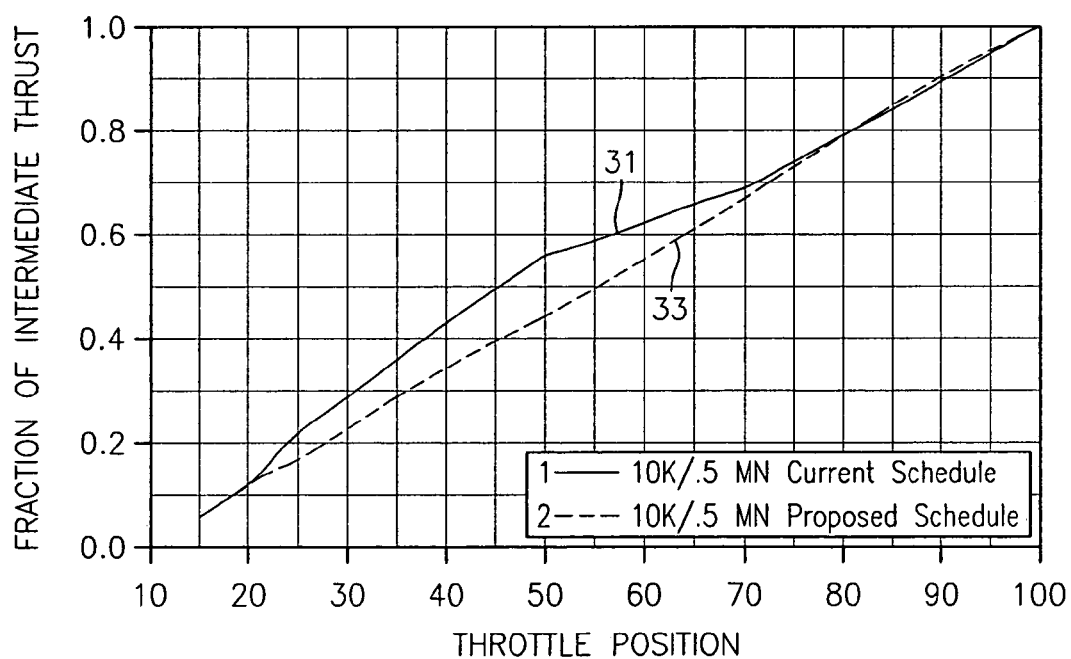
Figure 3C:
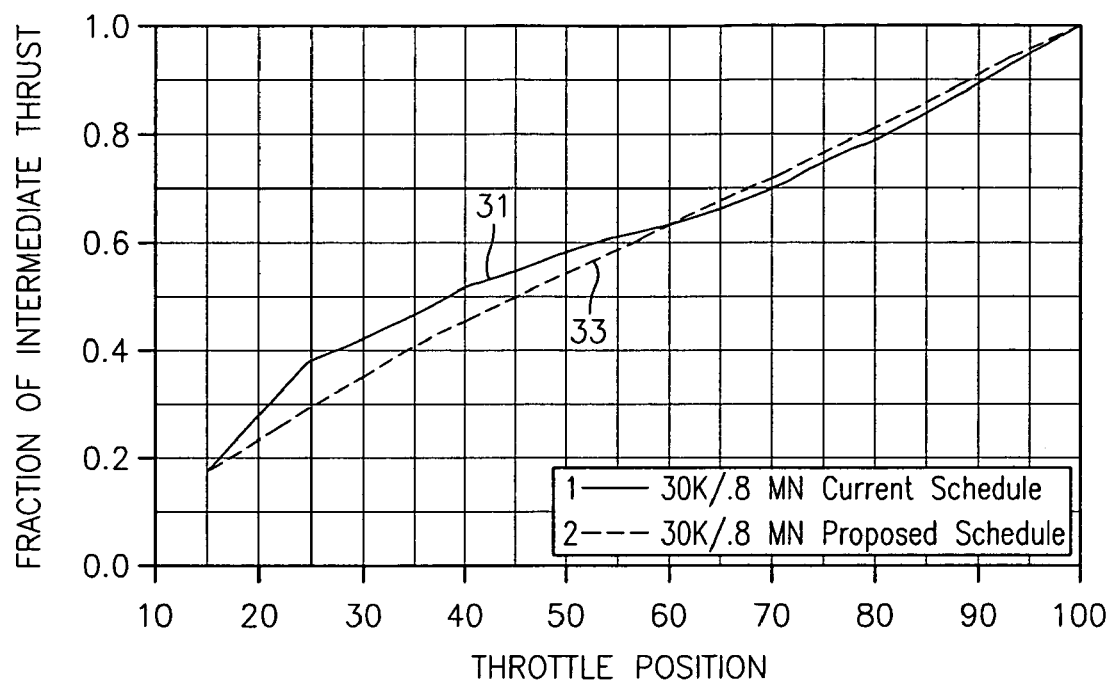

FIGS. 3a–3c show a comparison of thrust linearity between the method known in the art 31 and the method of the present invention 33 at three different but representative flight conditions, sea-level (SL)/0.2 MN, 10K/0.5 MN, and 30K/0.8 MN, respectively. The method known in the art 31 was defined to provide linear thrust near the SL/0.2 MN condition and therefore is essentially equal to the method of the present invention 33 relative to thrust vs. throttle linearity (FIG. 3a). However, it is seen in FIGS. 3b and 3c that at the other two conditions, the method known in the art 31 does not maintain good linearity, while the method of the present invention 33 achieves near linearity.

Figure 4:
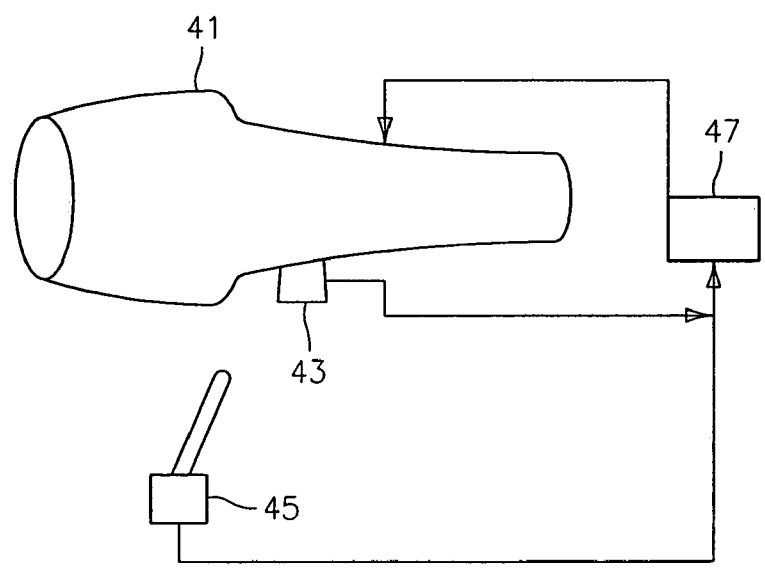
FIG. 4 A diagram of the system of the present invention.

With reference to FIG. 4 there is illustrated the system of the present invention. Operating parameters of operating engine 41, preferably a gas turbine engine, are sensed using a sensor 43 known in the art to sense gas flow, temperature, pressure, and the like. At the same time, the throttle position (FNRQ) is sensed at the throttle 45. W2RINT, W2RID, and FNRQ are electronically transmitted to processor 47. Processor 47 is an electronic computing device capable of accessing the schedules (S1, S2, S3), producing the outputs detailed above, and computing the W2RSCH. The calculated W2RSCH is utilized to add or subtract fuel flow to the engine 41 in order to obtain a linear airflow giving rise to a predominantly linear thrust response to the movement of the throttle position 45.

It is apparent that there has been provided in accordance with the present invention a method of altering the operation of a gas turbine engine in response to throttle adjustments to produce a thrust response linearly related to such throttle adjustments which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for achieving linear engine thrust response comprising the steps of:
   measuring a throttle position (FNRQ);
   measuring a plurality of engine parameters;
   computing an idle power schedule airflow (W2RID) and an intermediate power scheduled airflow (W2RINT) using said plurality of engine parameters;
   inputting said idle power schedule airflow, said intermediate power scheduled airflow and said throttle position into a plurality of schedules to produce a plurality of outputs;
   combining said plurality of outputs to produce a part power scheduled airflow (W2RSCH); and
   using said W2RSCH to produce a near linear thrust response of said engine.

2. The method of claim 1, wherein measuring said plurality of engine parameters comprises measuring said plurality of engine parameters selected from the group consisting of a block number (XM), an inlet pressure (P2) and and an inlet temperature (T2).

3. The method of claim 1, wherein said inputting comprises the steps of:
   entering said W2RID into a first schedule to produce a W2RID index (W2RIDX); and entering said W2RINT into said first schedule to produce a W2RINT index (W2RINTX).

4. The method of claim 1, wherein said inputting comprises the steps of:
    entering said W2RID into a second schedule to produce a first output throttle position index FNRQX; and
    entering said W2RINT into said second schedule to produce a second output throttle position index FNRQY.

5. The method of claim 4, comprising the additional step of combining said FNRQX and said FNRQY to produce an FNRQ equivalent (FNRQEQ).

6. The method of claim 5 wherein said combining said FNRQX and said FNRQY comprises the step of combining said FNRQX and said FNRQY to produce said FNRQEQ according to an equation FNRQEQ=FNRQX+((FNRQYX−FNRQX)/full range)) (FNRQ−FNRQIDLE) where full range is (W2RINT−W2RID) and FNRQIDLE is an idle throttle position of said engine.

7. The method of claim 1, wherein said inputting comprises the step of entering an FNRQ equivalent (FNRQEQ) into a third schedule to produce an output PLAX.

8. The method of claim 1, further comprising the additional step of combining an output PLAX, an output W2RID index (W2RIDX), and an output W2RINT index (W2RINX) to produce a power part index (PLAIDX).

9. The method of claim 8, wherein said combining said PLAX, said W2RIDX, and said W2RINX comprises the step of combining said PLAX, said W2RIDX, and said W2RINX according to an equation PLAIDX= (PLAX−W2RIDX+bias)/(W2RINX−W2RIDX+bias) where bias is approximately 0.0001.

10. The method of claim 1, wherein said combining said plurality of outputs to produce said W2RSCH comprises the step of combining said W2RID, said W2RINT, and a power part index (PLAIDX) according to the equation W2RSCH=W2RID+PLAIDX(W2RINT−W2RID).

11. The method of claim 1, wherein said using said part power scheduled airflow to produce said near linear thrust response of said engine comprises the step of using said W2RSCH to alter a fuel flow to said engine.

12. A system for achieving linear engine thrust response comprising:
    means for measuring a throttle position (FNRQ);
    means for measuring a plurality of engine parameters;
    means for computing an idle power schedule airflow (W2RID) and an intermediate power scheduled airflow (W2RINT) using said plurality of engine parameters;
    means for inputting said idle power schedule airflow, said intermediate power scheduled airflow and said throttle position into a plurality of schedules to produce a plurality of outputs;
    means for combining said plurality of outputs to produce produce a part power scheduled airflow (W2RSCH); and
    means for using said W2RSCH to produce a near linear engine thrust response of said engine.

* * * * *

UNITED STATES PATENT AND TRADEMARK OFFICE
CERTIFICATE OF CORRECTION

| | | |
|---|---|---|
| PATENT NO. | : 7,010,904 B2 | Page 1 of 1 |
| APPLICATION NO. | : 10/729480 | |
| DATED | : March 14, 2006 | |
| INVENTOR(S) | : Richard W. McBride | |

It is certified that error appears in the above-identified patent and that said Letters Patent is hereby corrected as shown below:

In Column 4, claim 2, line 62, "and" should be deleted (second occurrence).

In Column 6, claim 2, line 23, "produce" should be deleted.

Signed and Sealed this

Nineteenth Day of September, 2006

JON W. DUDAS
*Director of the United States Patent and Trademark Office*